US008185566B2

(12) United States Patent
George et al.

(10) Patent No.: US 8,185,566 B2
(45) Date of Patent: May 22, 2012

(54) CLIENT-BASED CACHING OF REMOTE FILES

(75) Inventors: Mathew George, Bellevue, WA (US);
David M. Kruse, Kirkland, WA (US);
James T. Pinkerton, Sammamish, WA (US); Thomas E. Jolly, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 12/353,982

(22) Filed: Jan. 15, 2009

(65) Prior Publication Data

US 2010/0185704 A1 Jul. 22, 2010

(51) Int. Cl.
*G06F 17/30* (2006.01)
(52) U.S. Cl. ........................................ 707/821; 707/781
(58) Field of Classification Search .................. 707/821, 707/781; 709/225, 224; 714/15; 726/25
See application file for complete search history.

(56) References Cited

U.S. PATENT DOCUMENTS

| | | | | |
|---|---|---|---|---|
| 6,016,500 | A | * | 1/2000 | Waldo et al. ........................ 1/1 |
| 6,173,293 | B1 | | 1/2001 | Thekkath et al. |
| 6,243,716 | B1 | * | 6/2001 | Waldo et al. ........................ 1/1 |
| 6,505,241 | B2 | | 1/2003 | Pitts |
| 6,760,736 | B2 | * | 7/2004 | Waldo et al. ........................ 1/1 |
| 7,103,617 | B2 | * | 9/2006 | Phatak ............................... 1/1 |
| 7,886,033 | B2 | * | 2/2011 | Hopmann et al. ............. 709/223 |
| 2001/0000812 | A1 | * | 5/2001 | Waldo et al. .................. 709/225 |
| 2004/0255048 | A1 | | 12/2004 | Lev Ran et al. |
| 2006/0026165 | A1 | | 2/2006 | Mohamed et al. |

OTHER PUBLICATIONS

Waidhofer, Gordon, "Oplocks, SMB/NFS Retrospective, Commerical Expectations (Long)", retrieved at <<http://playground.sun.com/pub/nfsv4/webpage/nfsv4-wg-archive-dec-96-jan-03/1050.html>>, Oct. 8, 2008, pp. 1-4.
"Pohmelfs", retrieved at <<http://tservice.net.ru/~s0mbre/old/?section=projects&item=pohmelfs>>, Oct. 8, 2008, pp. 1-2.
Mann, et al., "A Coherent Distributed File Cache with Directory Write-Behind", retrieved at <<http://birrell.org/andrew/papers/103-EchoCache-TOCS.pdf>>, ACM Transactions on Computer Systems, vol. 12, No. 2, May 1994, pp. 123-164.
Macklem, Rick, "Not Quite NFS, Soft Cache Consistency for NFS", retrieved at <<http://www.sagecertification.org/publications/library/proceedings/sf94/full_papers/macklem.ps>>, p. 17.
"NFS Network File System," retrieved at <http://www.ltn.lv/~guntis/unix/NFSp4.ppt>, pp. 1-44, Apr. 4, 2006.
"The Tod Point Group," "WAFS Solutions," retrieved at <http://www.solutioncentre.co.uk/downloads/packeteer/tpg have have nots scl.pdf>, pp. 1-5, 2006.

* cited by examiner

*Primary Examiner* — Jean M Corrielus
(74) *Attorney, Agent, or Firm* — Merchant & Gould P.C.

(57) ABSTRACT

A lease system is described herein that allows clients to request a lease to a remote file, wherein the lease permits access to the file across multiple applications using multiple handles without extra round trips to a server. When multiple applications on the same client (or multiple components of the same application) request access to the same file, the client specifies the same lease identifier to the server for each open request or may handle the request from the cache based on the existing lease. Because the server identifies the client's cache at the client level rather than the individual file request level, the client receives fewer break notifications and is able to cache remote files in more circumstances. Thus, by providing the ability to cache data in more circumstances common with modern applications, the lease system reduces bandwidth, improves server scalability, and provides faster access to data.

8 Claims, 4 Drawing Sheets

CLIENT-BASED CACHING OF REMOTE FILES

BACKGROUND

In a client-server environment, clients often cache data that the server owns and manages. The client stores a copy of data from the server locally on the client (e.g., in random access memory (RAM), a page file, a local hard disk, or a flash memory device). The client can access and modify the cached data locally without communicating across a network or other communication channel for accessing the data remotely at the server. Because network access is much slower than local access, accessing data locally is more efficient and reduces the burden upon the server so that the server can handle more requests. Local caching may have many benefits. For example, local caching allows the client to combine multiple write operations on the same region of a file into one write operation across the network. In addition, for read operations the client does not need to request data from the server for each operation if applications read the data multiple times. Caching improves the response time of applications because the applications do not wait for the client to send data across the network to the server upon every request.

One consideration when a server allows multiple clients to access and cache data is ensuring that the clients do not perform conflicting actions on locally cached copies of the data. For example, if one client writes new data to its local cache and a second client reads data from its local cache, the second client will be unaware of the first client's changes without mechanisms on the server to ensure cache coherency. Some network protocols provide a cache coherency mechanism whereby clients inform the server of the manner in which the client will use and cache the data (client intent). For example, a client may cache only reads, only writes, both reads and writes, and so forth. Clients may also have the ability to cache file handles so that applications can reuse the same handle for later requests to open the same file.

In SMB 2, the mechanism for performing this type of cache coherency is called an opportunistic lock (oplock). A client opportunistically requests the type of access that it wants to a file and the server conditionally grants or denies access. Even if the server grants access, the server may later break the lock (called a break) by sending the client a notification that another client has requested conflicting access. In the example described above, if the first client obtained a write-based oplock to a file, the second client's request to obtain a read-based oplock would fail, and the second client would thereby know that the locally cached data could be stale so that the second client will retrieve the newest data from the server. Using knowledge of the clients that are accessing a particular file and the intent expressed by each client, the server can manage access to the file so that each client stays consistent. For example, the server may temporarily cause a new client to wait for an existing client (who is caching server data) to flush cached data (e.g., sending cached, modified data back from the client to the server) and cause the data on the server to be consistent, before allowing the new client to access the data.

Unfortunately, the existing oplock semantics were designed 20 years ago when application behavior was significantly more simple and predictable. On modern operating systems, developers build applications over multiple layers of abstraction, and often end up performing redundant file system operations. For example, several different components within the same application may open the same file, each with different intentions for using the file (e.g., some reading and some writing). The cost of these redundant operations may be acceptable when the file is stored locally, but when an application accesses the file over a network the cost can quickly add up, resulting in unresponsiveness observed by an end user or network chattiness observed by a network administrator. The existing oplock model allows clients to cache data under some circumstances, but modern applications operate outside of the caching circumstances anticipated by the SMB 2 designers in many cases, with the result that the client is often unable to locally cache data or file handles.

In addition, modern computing systems run many more applications simultaneously than in the past, and several applications may attempt to access the same remote file at the same time. SMB 2 and other protocols typically treat each access request as coming from a separate client, even if the requests come from different applications on the same client. When multiple applications are running on the same client, the likelihood is high that a user is using the applications to perform a single task that involves a particular data file. As an example, a shell (e.g., computer user interface) may be trying to query icon attributes at the same time that a document application is trying to open and save a document. This can break an oplock related to the document so that the client determines the cache to no longer be valid. This makes read/write operations slower because they have to go across the network. As another example, the shell may try to render a preview of a document in a smart icon and at the same time, a search indexer may try to index the content. When two applications on the same client decide to access the file simultaneously, the server could revoke the ability of that client to cache data. These situations further reduce the opportunity for caching using existing caching semantics.

SMB2 oplocks have several limitations. First, oplocks are tied to an open file handle. When a client opens a file, the client requests a particular oplock and receives the lock along with a handle to the file from the server. This means that a client can maintain an oplock only if it has an open handle to a file. Second, the protocol does not allow clients to cache writes and open handles if there is more than one open handle to the file. As noted above, most modern applications open multiple handles to the same file, effectively resulting in a loss of write caching and handle caching. For the same reason, multiple clients cannot cache open file handles. Finally, if multiple applications are read-caching data, the client cannot maintain the read-cache after the application that initially read the data closes the handle to the file. This is because as noted above the oplock is associated with the handle with which it was opened.

SUMMARY

A lease system is described herein that allows clients to request a lease to a remote file, wherein the lease permits access to the file across multiple applications using multiple handles without extra round trips to a server. A client initially specifies a file and requests a lease from the server. The server determines whether to grant a lease based on other client requests related to the specified file. If the server grants the lease, the client receives a lease identifier and allowable caching of the file. When a server receives a conflicting request to access the file, the server sends the client a lease break notification. When multiple applications on the same client (or multiple components of the same application) request access to the same file, the client specifies the same lease identifier to the server or may handle the request from the cache based on the existing lease. Because the server identifies the client's cache at the client level rather than the individual file request level, the client receives fewer break notifications and is able to cache remote files in more circumstances. Thus, by providing the ability to cache data in more circumstances common with modern applications, the lease system reduces bandwidth, improves server scalability, and provides faster access to data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A lease system is described herein that allows clients to request a lease to a remote file, wherein the lease permits access to the file across multiple applications using multiple handles. A client initially specifies a file and requests a lease from the server. The client may pass an identifier (e.g., a globally unique identifier (GUID) or key) to distinguish the lease from other leases, or the server may provide an identifier when the server responds to the lease request. The server determines whether to grant a lease based on other client requests related to the specified file. If the server grants the lease, the client has an identifier and certain allowable uses of the file. For example, when the client requests a lease the client may also request read access, write access, and/or handle caching access. When a server receives a conflicting request to access the file, the server sends the client a revocation or downgrade of the lease. For example, if the server receives a request from another client to read file data and the existing client has read/write access to the file, the server may revoke the existing client's lease or downgrade the lease by removing write access. When multiple applications on the same client (or multiple components of the same application) request access to the same file, the client specifies the same lease to the server or may handle the request from the cache based on the existing lease. As applications open and close files, the lease remains because the lease is not associated with any particular handle to the file. Thus, by providing the ability to cache data in more circumstances common with modern applications, the lease system reduces bandwidth, improves server scalability, and provides faster access to data.

System and Environment

Figure 1:
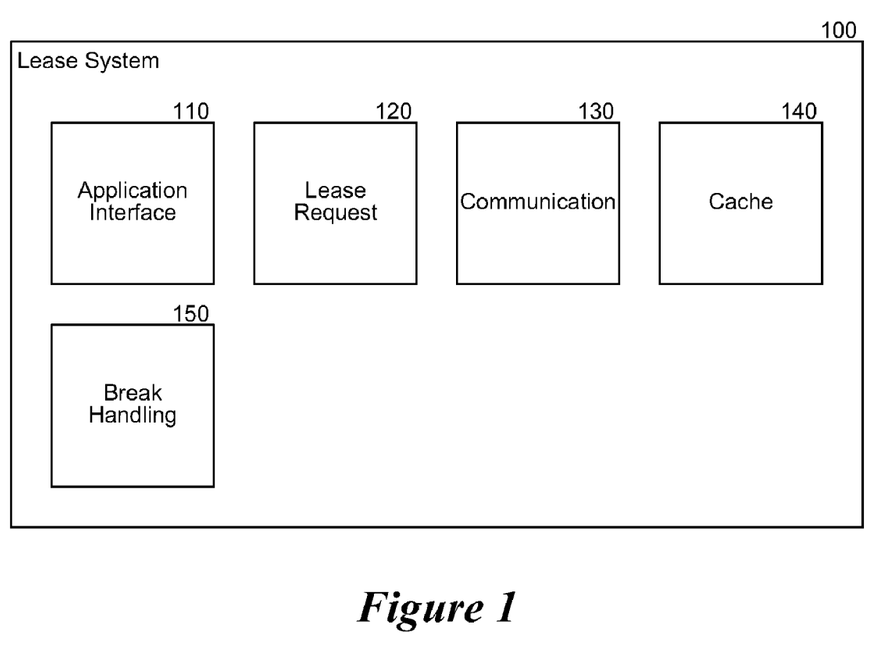
FIG. 1 is a block diagram that illustrates components of the lease system at a typical client, in one embodiment.

FIG. 1 is a block diagram that illustrates components of the lease system at a typical client, in one embodiment. The lease system 100 includes an application interface 110, a lease request component 120, a communication component 130, a cache component 140, and a break handling component 150. Each of these components is described in further detail herein.

The application interface 110 provides an interface through which applications submit requests to open remote files to the lease system 100 and receive file data. Applications may run in user or kernel mode and use an operating system file access interface to open and access files. The application interface 110 receives requests to access remote files, uses the lease request component 120 to send open requests to remote servers that include a lease identifier, and caches data received from the remote servers based on the terms of received leases. In some cases, the application interface 110 may provide file data to an application directly from the cache component 140 without additional communication with the remote server. For example, the lease system 100 may collapse the open request onto an existing handle as described further herein.

The lease request component 120 sends lease requests to a remote server and handles received lease responses. A lease response may either grant or deny a lease, and may suggest a lease that is lower than a requested access level based on existing client access to a file. For example, a server may deny a lease for write caching if there are multiple clients reading a file, but may grant additional read leases. Thus, the server may suggest a read lease in response to a request for a write lease. This reduces round trips between the client and server to negotiate an available lease state. Based on the lease request, the server can determine how each client is using a particular file and can inform clients (e.g., using break notifications described herein) when one client's use of a file is inconsistent with a caching strategy used by other clients.

The communication component 130 transmits requests and receives responses over a network that connects one or more clients and servers. The communication component 130 may include network hardware (e.g., a network interface card (NIC), switches, routers) and a TCP/IP or other low-level networking stack. The SMB2 or other higher-level protocol that implements the lease system 100 as described herein communicates using the communication component 130 with the other clients and servers.

The cache component 140 caches data at the client based on information received from the server. One purpose of the lease system 100 is to increase the opportunity to cache data so that the system 100 can serve many file access requests from the cache component 140 rather than from the server using a network round trip. The cache component 140 is associated with a particular lease identifier that the server uses to distinguish one cache provider from another. Requests to open files that the cache component 140 will cache use the lease identifier when requesting to open files stored on the server. The server compares the lease identifier to previously received lease identifiers and tracks each client so that the server can notify clients of new access to the file that conflicts with the previous caching strategy.

The break handling component 150 responds to break notifications received from the server. The server sends a break when access (e.g., to cache writes) that the server previously granted is no longer compatible with access requests of other clients accessing the same file. For example, if a server grants a lease for a first client to write cache data, and a new client requests to read cache data, then the server sends a break to the first client indicating for the first client to stop caching writes to prevent cache inconsistencies between the first client and the new client.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions (e.g., software) that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
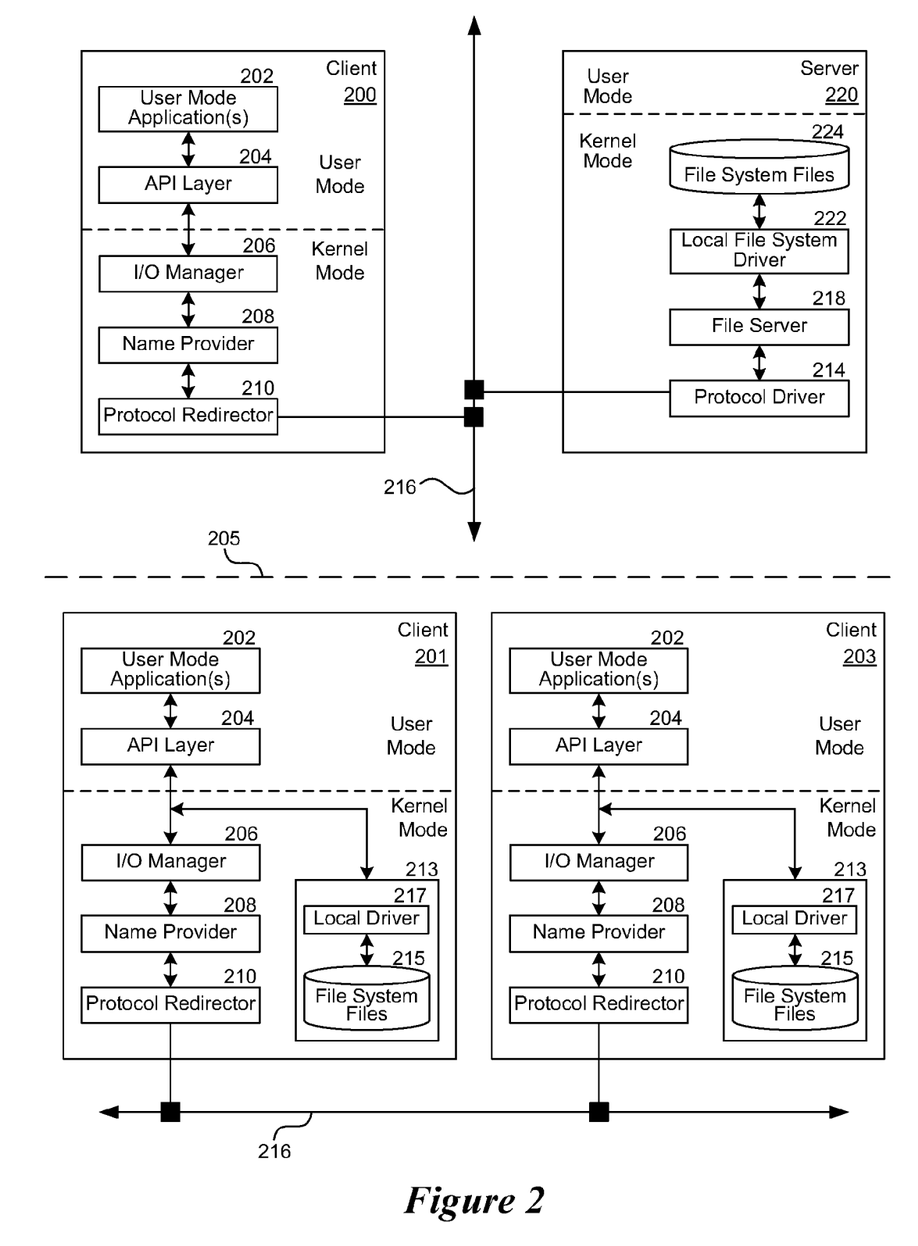
FIG. 2 is a block diagram that illustrates a typical operating environment of the lease system, in one embodiment.

FIG. 2 is a block diagram that illustrates a typical operating environment of the lease system, in one embodiment. There is shown a client machine 200 including at least one user-mode application program 202 that requests various system functions by calling an API layer 204 that provides application programming interfaces (APIs). At the top of the broken line 205 is illustrated a client-server interaction and at the bottom of line 205 a client-client interaction is illustrated. For accessing files stored on a remote network server 220, the application program 202 places file input output (I/O) API calls directed to a network resource to an API layer 204. For example, applications can examine or access resources on remote systems by using a Uniform Naming Convention (UNC) standard with Win32 functions to directly address a remote resource, e.g., via a drive mapped to a network shared folder or the like.

When an application calls a file I/O API (e.g., a file open or create request) with a remote filename such as a UNC name, a file I/O request is received at an I/O manager 206. To handle the remote name, the I/O manager 206 calls a name provider 208 to determine which device handles the name. In other words, the name provider 208 (e.g., comprising a kernel mode driver) determines which network to access when an application program 202 uses an I/O API to open a remote file upon a create request. To determine a device that can handle the given name, the name provider 208 polls (via asynchronous I/O request packets, or IRPs) any redirectors that have previously registered with the name provider 208, e.g., the protocol redirector 210. Each redirector that can handle the name responds back affirmatively, and if more than one responds, the name provider 208 determines from a priority order (e.g., maintained in at least one system registry key or the like) which one has precedence to handle the request.

As part of the response to the name provider 208, each redirector that recognizes the name indicates how much of the name is handled by that redirector. For example, if the name is the UNC name \SERVER\SHARE\foo\bar1.doc, the redirector 210 recognizes the name as capable of being handled, and the server responds by claiming the string "\SERVER\SHARE" as its own. When at least one redirector (e.g., the redirector 210) responds and provides the caching information, the name provider 208 driver caches the information in association with the redirector that responded, (if more than one, it caches the information of the one that takes precedence), whereby further requests beginning with that string are sent directly to that redirector 210, without the polling operation. For example, if the redirector 210 comprises an SMB redirector, future SMB requests directed to a network share corresponding to a cached string are passed to the redirector 210, which then packages those SMB requests into a data structure that can be sent across the network to that remote SMB server.

In one implementation, the redirector 210 is a kernel mode component that provides I/O requests to a remote server 220 via a protocol driver 214 (e.g., TDI transport) connected to a communications link 216. The server 220 receives the I/O requests at a counterpart protocol driver 214, and passes them to a file server 218 and local file system driver 222 (e.g., FAT or NTFS) on its local file system files 224. The server 220 uses a file system driver that communicates with the server driver on a remote server system. In addition, the server file system driver 222 and the file server 218 service work for the connections requested by client-side redirectors, forwarding them to the appropriate local file system driver, such as NTFS.

In one embodiment, when accessing files on remote servers 220, for example, the file server and not the client application program 202 requests the opportunistic lock from the remote server 220. Client applications directly request opportunistic locks when the oplock is intended for a file on a local file system (as shown on the bottom of FIG. 2). This is illustrated between client 201 and client 203 below the broken line 205. The client 201 comprises similar components as client 200 above the broken line 205 and in addition comprises a storage component 213. The storage component 213 comprises file system files 215 local to the client and accessed via a local driver 217 through the I/O manager 206 and/or through the API layer 204. When the client requests an oplock on a local file, the request goes directly to the local file system and does not travel over the remote I/O path as indicated in the client-server interaction above broken line 205, which separates the two different interactions. Other clients connected to the communications link 216, for example client 203, therefore also benefit from the oplock mechanisms intended for a file on a local file stream.

Leases

When requesting a lease, a client passes two pieces of information to the server: a file identifier and a set of requested capabilities. The file identifier may include a UNC path or other common mechanism for identifying a file. The set of requested capabilities may include one or more flags that correspond to read, write, and handle access or other access capabilities. The client may also pass additional information, such as an identifier for the client that distinguishes the client from other clients. The identifier can be provided by the protocol, or the server can use the source address. This allows a client to establish multiple connections to the server and share leases across each connection.

The requested capabilities can be determined in several ways. Typically, the client is opening a file in response to an application request to access the file. The client may request only as much access as the current application wants. For example, if the application requests read access, then the client may request a read-based lease from the server. In some embodiments, the client may request additional access so that if the client receives additional application requests for additional access, the client can handle those requests without an additional request for additional access to the server. For example, the client may always request full access to the file, and then listen for the server to send break notifications indicating that other clients want to access the file. When the client receives a break notification, the client may request the lowest access level that will satisfy each application on the client that is currently accessing the file. This is an efficient approach when, for example, a large percentage of the time only one client accesses a particular file at a time. In the few cases when multiple clients do access the same file, each client can negotiate the level of access that it needs with the server.

Another piece of information is the lease identifier, which may be provided by the client or generated by the server. From the server's perspective, the lease identifier distinguishes one client from another (or more specifically one cache from another). Previously, this information was unavailable to the server, and the server assumed that each request to access a file came from a different cache provider (e.g., client). Thus, when requests conflicted, the server in most cases had to issue a break. Using the lease system, the server can determine when requests to access the same file come from the same client, and can reduce the number of breaks (e.g., by assuming that requests from the same client do not cause cache incoherence) so that caching is effective in more situations.

Figure 3:
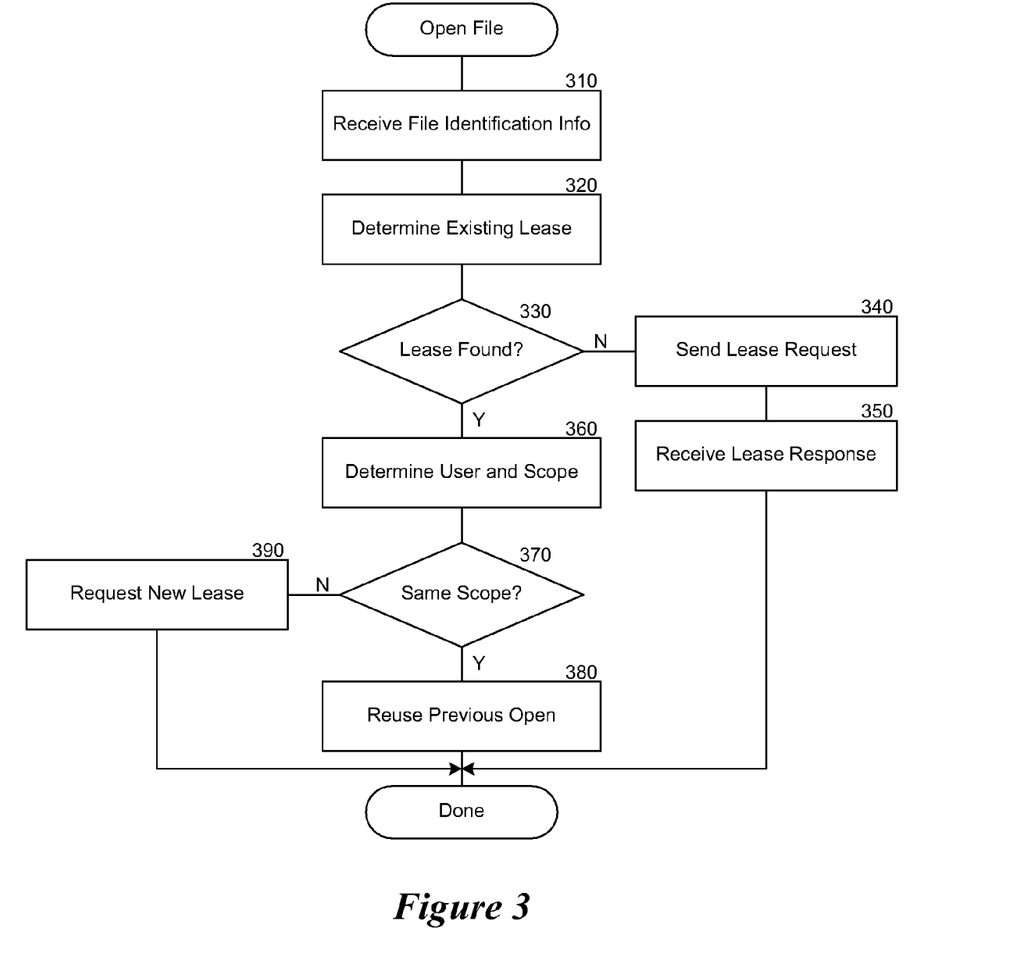
FIG. 3 is a flow diagram that illustrates the processing of the lease request component, in one embodiment.

FIG. 3 is a flow diagram that illustrates the processing of the lease request component, in one embodiment. The component is invoked when an application requests that a client open a remote file. In block 310, the component receives information from the application indicating the file to open in an open request. For example, the application may provide a UNC path to a remote file accessible over a network. Continuing in block 320, the component determines whether a lease exists for the indicated file. For example, the component may look up the UNC path in a table of leases. The lease provides cache coherency information associated with the remote file independent of zero or more open handles to the remote file. Continuing in decision block 330, if the component does not find an existing lease, then the component continues at block 340, else the component continues at block 360. In block 340, the component sends a request to the server to open the file and request a lease. The component may generate a lease identifier and send the identifier to the server with the request. Continuing in block 350, the component receives a response from the server indicating whether the server granted the requested lease. The component also receives the file data and metadata for the requested file that the component stores in a local cache for later use.

In block 360, reached if there was an existing lease, the component determines whether a user associated with a current request is the same as a user associated with the existing lease, and whether the access requested to the file is compatible with the scope of the existing lease. When the user is different, it may be desirable to send the request to access the file to the server so that the server can enforce any user-specific access control. In decision block 370, if the user and requested access are the same as the existing lease, then the component continues at block 380, else the component continues at block 390. In block 380, the component collapses the current open request onto the existing lease, and provides requested data from the cache when available. For example, if a new application wants to read from a remote file that is already open for reading by a first application, then the component may provide the existing handle of the first application to the new application for accessing the file, without making a round trip to the server. This improves the apparent responsiveness of the new application. In block 390, reached when the existing lease is insufficient for the new application, the component requests a new lease from the server to see if caching for the type of access requested by the new application is compatible with the use of the file by other clients. After block 390, these steps conclude. When the client receives the next request to access a remote file, the component performs these steps again.

In some embodiments, the lease system allows write caching if there is exactly one lease on the file. Since multiple handles to the same file from the same client use the same lease, the system allows write caching as long as there are no other clients accessing the file. In this way, a single client with multiple applications making extensive use of a file can still cache data so long as no other client requests concurrent access to the file. In many cases, only a single client accesses a file at a time, so this allows the lease system to provide caching in many common scenarios. Write caching also permits the client to cache byte-range locks on the file, since it indicates exclusive access (e.g., a client does not need to send locks to the server since no one else is accessing the data system).

In some embodiments, the lease system allows handle and read caching when multiple clients are reading from the same file. This implies that clients can continue to cache data and open file handles even after an initial application has closed the handle or terminated. Read and handle caching allows the client to hold an open after the applicatin has closed its handle. If the application decides to reopen the file, the applicatin can find and reuse an existing open (and the data in the cache). The lease also survives the application, and allows additional applications on a client to access the file and share the same cache.

In some embodiments, the lease system allows a client to delay closing of file handles using handle caching. The client can also collapse new open requests to the same file onto an existing open handle, provided the new open is compatible with the existing opens (e.g., in terms of access requested). The system also allows the client to flow back collapsed opens to the server when handle caching is revoked by the server. In other words, over time the client may have several applications accessing a file using the same handle, when the client receives a server break. When the client receives the break, the client can request a new handle for each of the applications or request a reduced level of access if the applications are not using as great a level of access as the original application that opened the handle. This can be viewed as a type of lazy access request that reduces network traffic between the client and the server by postponing notifications of a change in access from the client to the server until there is a conflict for a particular file.

Lease Revocation

In some embodiments, the lease system does not revoke or downgrade leases due to an operation on a file handle associated with the same lease. Thus, no matter what a single client is doing, the cache will remain available and coherent. A client may have multiple applications accessing the file or multiple components within a single application accessing the file, but no breaks will occur. In other words, using the lease system the server operates at the granularity of clients rather than at the granularity of individual access requests. The client takes responsibility for requesting the type of lease to satisfy each of its applications and requests for a particular file.

In some embodiments, the lease system assigns a duration to leases, after which the leases expire and the server revokes the leases. For example, a server may grant a lease with a particular time-to-live (TTL), after which the client can no longer rely on the lease to ensure cache coherency. When a lease expires or is near expiration, the client may request a new lease from the server or renew the existing lease so that the client can continue to access remote files. Lease expiration allows the server to clean up resources associated with leases even when clients disconnect or are non-responsive to server requests.

A server initiates an oplock break by sending an oplock break notification to one or more clients. Depending on the semantics of the break, the client may respond with an oplock break acknowledgement request. The server will then respond with an oplock break acknowledgement response. As opposed to the traditional model where the oplock break is associated with an open handle, the new model associates an oplock break with the lease identifier. Other data that could help the client more intelligently flush out open handles and data may also be included in the protocol. The client closes any delay-closed and close-pending opens before acknowledging the oplock break. If the break indicates a loss of handle caching, then the client will close all existing (delay closed) opens to the file, including closing the open on which the client received the oplock break last if that handle was also delay closed.

In some embodiments, when responding to an oplock break notification, the client has the ability to request a higher oplock level than that indicated in the oplock break notification. However, there is no guarantee that a server can grant the oplock request. In such a situation, the server fails the oplock break acknowledgement request with an error so that the client can take appropriate action (e.g., flush unwritten data) and re-acknowledge.

Figure 4:
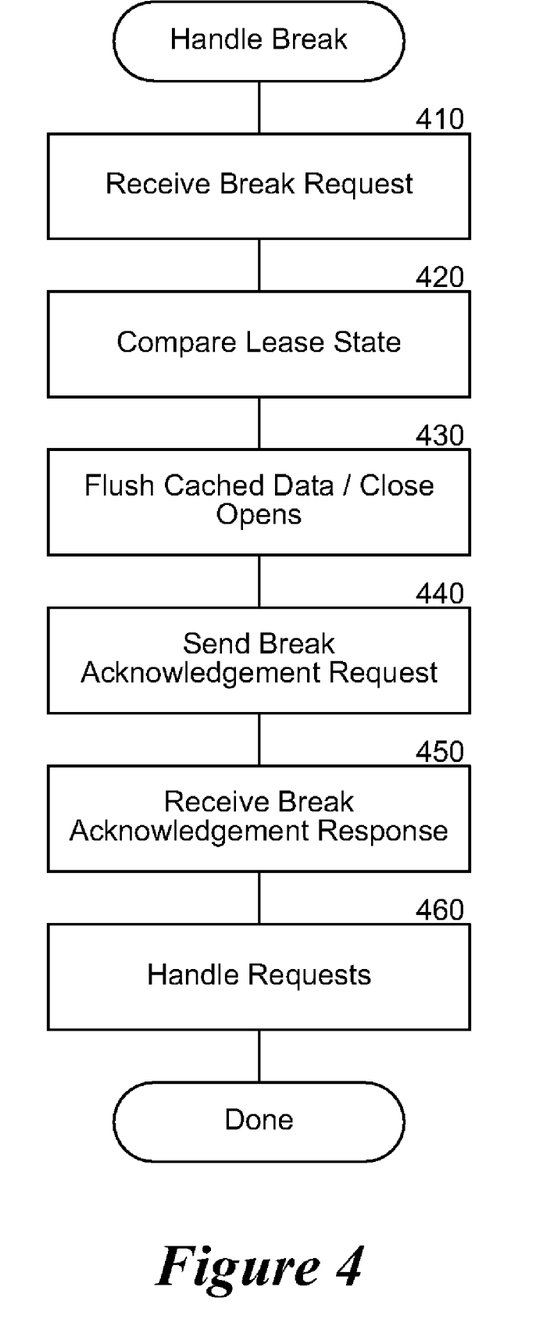
FIG. 4 is a flow diagram that illustrates the processing of the break handling component of the lease system, in one embodiment.

FIG. 4 is a flow diagram that illustrates the processing of the break handling component of the lease system, in one embodiment. The component is invoked when a server sends a break notification to a client. Typically, the break is the result of a second client attempting to access the same file as the original client in a way that conflicts with an existing lease of the original client. The break allows the original client to keep its cache coherent by informing the original client of the manner in which the second client may use the file. In block 410, the component receives a break request from the server. The break request may include information such as the lease identifier provided by the client when the client opened the file to which the break applies, the current lease state of the lease held by the client, and the new lease state available to the client. For example, if a new client wants to read from a remote file, a previous client with a write-caching lease may receive a break that indicates that write caching is no longer available, but read caching is available. Continuing in block 420, the component compares the old lease state to the received new lease state.

Then in block 430, the component flushes any cached data that the client will no longer cache or that is no longer valid based on the new lease state, and closes any delay closed opens. For example, if the client was caching writes, and the new lease state indicates that write caching is no longer available, then the client flushes pending written data to the server and stops caching data written to the file by one or more applications. Continuing in block 440, the component sends an acknowledgement request to the server, to indicate that the client has handled the break. The acknowledgement request may request a different lease scope based on the desired access to the file of applications on the client. In some embodiments, the client can acknowledge the lease break by closing all opens for a given lease instead of sending an explicit acknowledgement. Continuing in block 450, the component receives an acknowledgement response from the server. If the client requested a new lease scope, then the received response indicates whether the server granted the new lease scope. Continuing in block 460, the client handles requests from the cache that are compatible with the new lease state and sends other requests to the server. After block 460, these steps conclude.

In some embodiments, each handle to the same file from a given client shares the same lease identifier. In this way, the server treats any request from the client as making use of the same cache. Thus, there is no cache coherency conflict between any use of the file on that client, and the server can avoid sending breaks unless a second client (with a different lease identifier) requests access to the file that would conflict with the original client's access.

In some embodiments, the lease system provides the same lease identifier for a file accessed using different names. Clients can access remote files through a variety of paths. For example, a particular server may share a file through two different shares (e.g., \\server\share1\file.doc may point to the same file as \\server\share2\file.doc or \\server\share2\folder\file.doc). It may not be possible for a client to determine that two files accessed through different paths are the same file. Thus, the lease system may request that the server resolve whether two files are the same, and provide the same lease identifier for accessing both. This allows the client to cache a file under the same lease key even in the presence of name aliasing.

In some embodiments, the lease system provides backwards compatibility with older servers and clients. On the client side, the system may provide an oplock level in a create request that matches a legacy oplock level along with new parameters, such as the lease identifier. The SMB2 protocol allows clients to specify an extended create parameter (ECP). If the server is a legacy server, it will ignore the new parameters and grant the client an oplock of the requested legacy type. The client can determine by the response type whether the server granted a legacy oplock or a lease based on the client's request. Similarly, a server that implements the lease system may continue to provide legacy oplocks to older clients that access files without specifying new parameters, such as the lease identifier. In this way, the system can operate in a mixed environment of clients and servers.

In some embodiments, the lease system allows the server to avoid a break when a disconnected client reconnects to the server. In the past, if a client lost a connection to the server, the client would retry the connection by opening a new file handle to the server. This caused any existing clients to receive a break notification if the requested access conflicted with that of the existing clients. The lease system provides the previous lease identifier to the server when the client reconnects. If the server recognizes the lease identifier based on an existing lease, the server can grant the client the same level of oplock that the client previously held and avoid sending breaks to existing clients. Particularly with the increased use of wireless networks, disconnecting and reconnecting clients have become more common, and this capability of the lease system reduces network bandwidth consumption in such situations.

Even when a client closes a remote file normally, the server may still store the lease information for a period in case the client re-opens the file. Many application patterns involve an application repeatedly running and accessing the same file, and by maintaining the lease identifier and other information, the server reduces the burden of responding to such requests.

In some embodiments, the lease system allows a client to collapse subsequent open request for a file onto an existing open without informing the server of the new request to use the file. For example, if a new application attempts to open a file that is already open, and the existing open specified a caching level that is compatible with the existing lease, then the client can allow the new application to access the file using the existing handle or lease. If the new application request is not compatible with the existing lease, the client may request a different lease from the server that encompasses the level of access requested by each application accessing the file on the client. The client may also take into account the user attempting to access the file (e.g., not allowing collapsing for different users) to allow the server to properly enforce access control. For example, one user may have access to a file and another may not have access based on server access control lists (ACLs), and the client avoids allowing the user without access to access the file via a collapsed open request.

When the lease system collapses handles, there may be some instances in which the handles will be un-collapsed and flow back to the server as individual requests. When a break occurs, the server may benefit from additional information about how applications are actually using a file through a particular lease. Thus, the client may respond to the break by requesting a new lease or leases for applications that were previously sharing one or more collapsed opens. For example, if one application was reading and writing a file and another was only reading the file, the client may have collapsed each use onto a single read/write-based lease. If the server sends a break indicating that write caching is no longer available, then the client can still request a read-based lease for the read-only application, so that application can continue using cached data.

SMB Protocol Changes

The following are specific examples of changes to the SMB2 protocol that could support the lease system described herein.

In some embodiments, the client and server advertise capability for the enhanced oplocks used by the lease system via the SMB2 negotiate request/response. During this exchange, the client and server can provide one or more bits describing their capabilities. The lease system provides a new bit, SMB2_GLOBAL_CAP_ENHANCED_OPLOCKS, through which the client and server provide information about their support for the lease system. The lease system may also modify the protocol dialect revision (i.e., version number) to indicate support for the lease system.

In some embodiments, clients provide extended information during an open request. For example, the lease system may define a new SMB2 create context (ECP) to request an enhanced oplock as well as to pass the lease identifier to the server. The server can return the granted oplock via the same ECP. Following is an example data structure for conveying this information:

```
typedef struct {
    GUID    LeaseKey;
    DWORD   LeaseState;
    DWORD   Flags;
    INT64   LeaseDuration;
}   SMB2_ECP_REQUEST_LEASE,     // Client->Server
    SMB2_ECP_GRANTED_LEASE;     // Server->Client
```

As noted previously, the lease identifier (e.g., LeaseKey GUID above), may be generated by the client, so that the identifier can be used to identify the client side entity via which a file is cached. Multiple handles to the same file may share a data structure on the client that stores the lease identifier used in the create request. These handles will also thereby have a shared oplock state on the server, and consequently will not break each other's oplock state. Alternatively or additionally, the server may generate the lease key based on the client-ID and the file being opened or other information. This allows the server to inform the client that a file opened via two different names actually refers to the same file on the server and hence tell the client to use the same cache even though the path names are different.

In some embodiments, the server provides the enhanced oplock in the create response. Although the client may set the LeaseState field in the create request to a legacy oplock level so that a server which does not understand the enhanced oplocks can still grant a legacy oplock to the client, the server may ignore this level when the above ECP is used by the client. Thus, a server that supports the enhanced sets the LeaseState in the create response to a new value, SMB2_OPLOCK_LEVEL_LEASE, that indicates that the server granted an enhanced oplock as described herein.

In some embodiments, when a server initiates a break as described herein, the server sends the following data structure to the client to inform the client of the break and to allow the client to more intelligently flush out open handles and data.

```
typedef struct
{
    USHORT  StructureSize;
                // sizeof(SMB2_NOTIFY_BREAK_LEASE)
    USHORT  Reserved;
    ULONG   Flags;
    GUID    LeaseKey;
    ULONG   CurrentLeaseState; // current oplock level
    ULONG   NewLeaseState; // new oplock level
                (subset of current)
    ULONG   BreakReason; // what caused the break
    union {
        struct {
            ULONG AccessMaskHint;   // Used to selectively close
            ULONG ShareMaskHint;    // cached handles.
        } Create;
    } Reason;
} SMB2_NOTIFY_BREAK_LEASE;
```

The AccessMaskHint and ShareMaskHint optionally provide a hint to the client as to what handles to flush out when the server indicates revocation of handle caching. The client can also use these flags to retain or give up additional oplock state when acknowledging the break. Upon receiving a break request, the client performs any relevant actions (e.g., flushing cached data), and sends an oplock break acknowledgement request. Following is a data structure for the request according to some embodiments of the lease system.

```
typedef struct
{
    USHORT  StructureSize; // sizeof(SMB2_REQ_ACKNOWLEDGE_BREAK_LEASE)
    USHORT  Reserved;
    ULONG   Flags; // downgrade ok, intermediate ack
    GUID    LeaseKey;
    ULONG   LeaseState; // New oplock level requested by client
    INT64   LeaseDuration;
} SMB2_REQ_ACKNOWLEDGE_BREAK_LEASE;
```

In response, the server determines how to handle the client's request and sends an acknowledge break response. For example, the client may have requested a different lock level based on the break and the server determines whether the new lock level will conflict with other clients' use of the file. Following is a data structure for the response according to some embodiments of the lease system.

```
typedef struct
{
    USHORT  StructureSize; // sizeof(SMB2_RESP_ACKNOWLEDGE_BREAK_LEASE)
    USHORT  Reserved;
    ULONG   Flags;
    GUID    LeaseKey;
    ULONG   LeaseState; // New oplock level granted to the client
    INT64   LeaseDuration; // Duration of new lease
} SMB2_RESP_ACKNOWLEDGE_BREAK_LEASE;
```

Oplock break notifications from the server and oplock break acknowledgement responses from the server can use the same SMB2 command code, SMB2_0_COMMAND_OPLOCK_BREAK. The client identifies the type of response by looking at the message ID in the SMB2 header. For an oplock break notification the server sets the message ID to SMB2_INVALID_MID. For an oplock break acknowledgement response, the message ID will match that of the client's oplock break acknowledgement request. Alternatively or additionally, the client can use the StructureSize field or other information to distinguish the two responses.

From the foregoing, it will be appreciated that specific embodiments of the system have been described herein for purposes of illustration, but that various modifications may be made without deviating from the spirit and scope of the invention. For example, although extensions to the SMB2 protocol have been described, the lease system can be used with other network access protocols. As another example, although accessing files has been described, the techniques of the lease system can be applied to other units of data, such as databases (or database entries), multi-file objects, and so forth. Accordingly, the invention is not limited except as by the appended claims.

We claim:

1. A computer-implemented method for caching information at a client related to a remote file stored at a server, the method comprising:
   receiving information from a software application indicating the remote file to open in an open request;
   determining whether a lease exists on the client for the indicated remote file, wherein the lease provides a lease duration and cache coherency information associated with the indicated remote file;
   when no lease exists on the client for the indicated remote file:
      sending a lease request to open a handle to the indicated remote file and request the lease that identifies one or more cache intentions of the client based on the access information received from the software application; and
      receiving a lease response indicating that the requested lease was granted;
   upon an expiration of the lease duration corresponding to the lease, delaying the closing of the handle to the indicated remote file; and
   wherein the preceding steps are performed by at least one processor.

2. The method of claim 1 wherein the open request comprises a UNC path to a remote file accessible over a network.

3. The method of claim 1 wherein determining whether a lease exists comprises looking up a UNC path associated with the remote file in a table of leases.

4. The method of claim 1 wherein sending a lease request comprises generating a lease identifier and sending the identifier to the server with the request.

5. The method of claim 1 wherein sending a lease request comprises providing one or more cache intentions in the lease request, wherein the cache intentions specify a manner in which the client accesses the remote file.

6. The method of claim 1 further comprising receiving file data and metadata for the requested remote file and storing the data and meta data in a local cache for later use.

7. The method of claim 1 further comprising determining whether a user associated with the current request is the same as a user associated with an existing lease, and when the user is different, requesting a new lease from the server.

8. The method of claim 1 further comprising, if an existing lease exists,
   determining whether a scope of access requested to the remote file is compatible with a scope of the existing lease; and
   if the scope of the access requested is the same as the scope of the existing lease, collapsing the current open request on the existing lease, without making a round trip to the server.

* * * * *